United States Patent
Yadav

(10) Patent No.: US 9,715,452 B2
(45) Date of Patent: Jul. 25, 2017

(54) METHODS TO REDUCE MEMORY FOOT-PRINT OF NUMA AWARE STRUCTURES AND DATA VARIABLES

(71) Applicant: Oracle International Corporation, Redwood Shores, CA (US)

(72) Inventor: Rahul Yadav, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/876,984

(22) Filed: Oct. 7, 2015

(65) Prior Publication Data

US 2017/0103018 A1    Apr. 13, 2017

(51) Int. Cl.
  *G06F 12/00* (2006.01)
  *G06F 12/084* (2016.01)
  *G06F 12/0893* (2016.01)

(52) U.S. Cl.
  CPC ........ *G06F 12/084* (2013.01); *G06F 12/0893* (2013.01); *G06F 2212/1016* (2013.01); *G06F 2212/62* (2013.01)

(58) Field of Classification Search
  CPC combination set(s) only.
  See application file for complete search history.

(56) References Cited

U.S. PATENT DOCUMENTS 8,949,529 B2 *   2/2015   Bellows ............. G06F 12/0802
                                                                711/118
9,256,534 B2 *   2/2016   Li ....................... G06F 12/0808

\* cited by examiner

*Primary Examiner* — Matthew Bradley
(74) *Attorney, Agent, or Firm* — Osha Liang LLP

(57) ABSTRACT

A method and system for making global variables NUMA-aware by identifying a first and a second global variable; determining a quantity of NUMA groups of a computing device; partitioning, based on the quantity of NUMA groups, the first global variable into a first global variable array of first global variable array elements; storing each first global variable array element in a different cache line of a first plurality of cache lines of a first cache associated with a first NUMA group of the NUMA groups; partitioning, based on the quantity of NUMA groups, the second global variable into a second global variable array of second global variable array elements; and storing each second global variable array element in a different cache line of a second plurality of cache lines of a second cache associated with a second NUMA group of NUMA groups.

20 Claims, 8 Drawing Sheets

METHODS TO REDUCE MEMORY FOOT-PRINT OF NUMA AWARE STRUCTURES AND DATA VARIABLES

BACKGROUND

Computing devices sometimes implement a non-uniform memory access (NUMA) scheme using two or more NUMA nodes. NUMA nodes often include, at least, one or more processors and some amount of memory (e.g., random access memory (RAM), cache, etc.). The time necessary for a given processor to access data (i.e., latency) from within the same NUMA node that the processor is in may be lower than the time necessary to access data from memory in other NUMA nodes of a computing device. Attempts to reduce the time needed to access data in computing devices implementing NUMA (e.g., by making variables and/or data structures NUMA-aware) may lead to increased cache cross-coherency traffic and/or an increase in the amount of memory used to store representations of the data.

SUMMARY

In general, in one aspect, the invention relates to a method for making global variables non-uniform memory access (NUMA)-aware. The method may include identifying a first global variable and a second global variable; determining a quantity of a plurality of NUMA groups of a computing device; partitioning, based on the quantity of the plurality of NUMA groups, the first global variable into a first global variable array comprising a plurality of first global variable array elements; storing each first global variable array element of the first global variable array in a different cache line of a first plurality of cache lines of a first cache associated with a first NUMA group of the plurality of NUMA groups; partitioning, based on the plurality of NUMA groups, the second global variable into a second global variable array comprising a plurality of second global variable array elements; and storing each second global variable array element of the second global variable array in a different cache line of a second plurality of cache lines of a second cache associated with a second NUMA group of the plurality of NUMA groups.

In general, in one aspect, the invention relates to a non-transitory computer readable medium comprising instructions that, when executed by a computer processor, perform a method for making global variables non-uniform memory access (NUMA) aware. The method may include identifying a first global variable and a second global variable; determining a quantity of a plurality of NUMA groups of a computing device; partitioning, based on the quantity of the plurality of NUMA groups, the first global variable into a first global variable array comprising a plurality of first global variable array elements; storing each first global variable array element of the first global variable array in a different cache line of a first plurality of cache lines of a first cache associated with a first NUMA group of the plurality of NUMA groups; partitioning, based on the quantity of the plurality of NUMA groups, the second global variable into a second global variable array comprising a plurality of second global variable array elements; and storing each second global variable array element of the second global variable array in a different cache line of a second plurality of cache lines of a second cache associated with a second NUMA group of the plurality of NUMA groups.

In general, in one aspect, the invention relates to a system for making global variables non-uniform memory access (NUMA) aware. The system may include a first NUMA group of a plurality of NUMA groups of a computing device. The first NUMA group may include a first memory, a first processor, and a first cache operatively connected to the first processor and the first memory. The system may also include a second NUMA group of the plurality of NUMA groups of the computing device. The second NUMA group may include a second memory, a second processor, and a second cache operatively connected to the second processor and the second memory. Additionally, the computing device, at least in part, may include functionality to identify a first global variable and a second global variable; determine a quantity of the plurality of NUMA groups of the computing device; partition, based on the quantity of the plurality of NUMA groups, the first global variable into a first global variable array comprising a plurality of first global variable array elements; store each first global variable array element of the first global variable array in a different cache line of a first plurality of cache lines of the first cache; partition, based on the quantity of the plurality of NUMA groups, the second global variable into a second global variable array comprising a plurality of second global variable array elements; and store each second global variable array element of the second global variable array in a different cache line of a second plurality of cache lines of the second cache.

Other aspects of the invention will be apparent from the following description and the appended claims.

DETAILED DESCRIPTION

Figure 1:
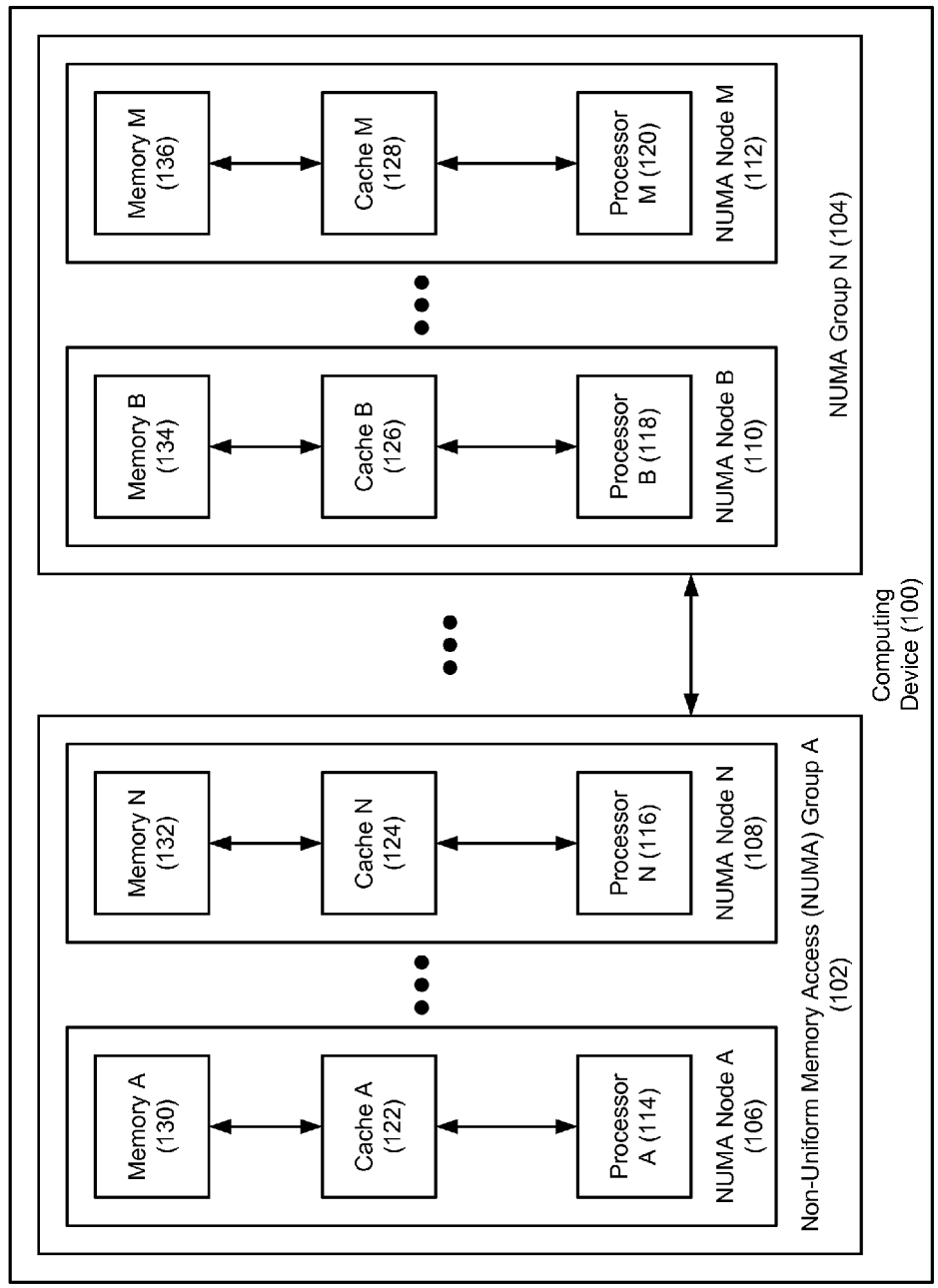
FIG. 1 shows a system in accordance with one or more embodiments of the invention.

Specific embodiments of the invention will now be described in detail with reference to the accompanying figures. Like elements in the various figures may be denoted by like names and/or like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the invention create non-uniform memory access (NUMA)-aware global variables with reduced memory footprints. Specifically, instead of being one central global variable for all threads executing in a multi-processor computing device, a global variable may be created as an array. The number of elements of the array may correspond to the number of NUMA groups (i.e., one or more NUMA nodes) of a computing device. More specifically, each element of an array representing a global variable may be placed on a separate cache line in one or more caches of each NUMA group. In other words, the global variable may be partitioned across a number of cache lines in each cache, with one of each of the cache lines across which the global variable is partitioned corresponding to a NUMA group of the computing device.

In one or more embodiments of the invention, global variable array elements of two or more global variable arrays are placed within the same cache line, and the cache lines that include the two or more global variable elements are placed within one or more caches of each NUMA group of the computing device.

In one or more embodiments of the invention, when a thread executing on a processor of a first NUMA node seeks to write to one of the global variables, only the global variable array element in the cache line corresponding to the first NUMA group is written to, and the corresponding cache line in each other cache in the computing device with a copy of the global variable element is marked as invalid. In one or more embodiments of the invention, when another thread executing on a processor of a second NUMA node seeks to subsequently read the global variable from a cache operatively connected to the processor on which the other thread executes, the invalid cache line that includes a global variable array element is identified, and the cache line is updated using the cache in which the global variable experienced a write. Once the cache line has been updated, the global variable may be read. Placing array elements from more than one NUMA-aware global variable on the same cache lines may reduce the memory footprint of NUMA-aware global variables within the caches of NUMA groups of a computing device.

FIG. 1 shows a system in accordance with one or more embodiments of the invention. As shown in FIG. 1, the system includes a computing device (100). In one or more embodiments of the invention, the computing device includes at least two NUMA groups (e.g., NUMA group A (102), NUMA group N (104)). Each NUMA group may include one or more NUMA nodes (e.g., NUMA node A (106), NUMA node N (108), NUMA node B (110), NUMA node M (112)). Each NUMA node may include one or more processors (e.g., processor A (114), processor N (116), processor B (118), processor M (120)). Each NUMA node may include one or more caches (e.g., cache A (122), cache N (124), cache B (126), cache M (128)). Each NUMA node may include any amount of memory (e.g., memory A (130), memory N (132), memory B (134), memory M (136)). Each of these components is described below.

In one or more embodiments of the invention, a computing device (100) is any device and/or any set of devices (e.g., a distributed computing system) capable of electronically processing instructions, serially or in parallel, and that includes at least the minimum processing power, memory, caches, input and output device(s), operatively connected storage device(s) and/or network connectivity in order to contribute to the performance of at least some portion of the functionality described in accordance with one or more embodiments of the invention. In one or more embodiments of the invention, a computing device (100) implements NUMA and includes at least two NUMA nodes (described below). Examples of computing devices include, but are not limited to, one or more server machines (e.g., a blade server in a blade server chassis), virtual machines (VMs), desktop computers, mobile devices (e.g., laptop computer, smartphone, personal digital assistant, tablet computer, and/or any other mobile computing device), any other type of computing device with the aforementioned minimum requirements, and/or any combination of the listed examples. In one or more embodiments of the invention, a computing device includes hardware, software, firmware, circuitry, integrated circuits, circuit elements implemented using a semiconducting material, registers, caches, memory controller(s), cache controller(s) and/or any combination thereof. For example, as used herein, the term computing device may include software executing on one or more processors of the computing device.

In one or more embodiments of the invention, the computing device (100) includes at least two processors (e.g., processor A (114), processor N (116), processor B (118), processor M (120)). In one or more embodiments of the invention, a processor (114, 116, 118, 120) is any hardware capable of, at least in part, executing sequences of instructions (e.g., the instructions of a computer program) in a computing device. In one or more embodiments of the invention, a processor (114, 116, 118, 120) is a collection of electronic circuitry capable of implementing various actions (e.g., arithmetic, Boolean logic, move data, etc.) in order to carry out instructions (e.g., write to a variable, read a value, etc.). For example, a processor may be a microprocessor fabricated, at least in part using a semiconducting material, as an integrated circuit. As used herein, the term processor (114, 116, 118, 120) may refer to single-core processors or multi-core processors.

In one or more embodiments of the invention, the computing device (100) includes memory (e.g., memory A (130), memory N (132), memory B (134), memory M (136)). In one or more embodiments of the invention, memory (130, 132, 134, 136) is a physical medium for storing information for use by a processor (114, 116, 118, 120) and/or any other component of a computing device. Memory (130, 132, 134, 136) may include functionality to store information for any amount of time. For example, memory such as Random Access Memory (RAM) may store information until power is removed from the system. As another example, memory may refer to more permanent storage of the computing device (e.g., hard disk drives, solid state drives, etc.) used, in part, to implement a memory paging scheme. In one or more embodiments of the invention, the memory (130, 132, 134, 136) of a computing device is operatively connected to one or more processors of the computing device. For example, memory may be connected to a processor via, at least in part, one or more caches (described below). In one or more embodiments of the invention, although not shown in FIG. 1, memory (130, 132, 134, 136) may include and/or be operatively connected to one or more memory controllers.

In one or more embodiments of the invention, the computing device (100) includes one or more caches (e.g., cache A (122), cache N (124), cache B (126), cache M (128)). In one or more embodiments of the invention, a cache is a type of memory that temporarily stores data that may be used again by a processor (114, 116, 118, 120). In one or more embodiments of the invention, a cache (122, 124, 126, 128) generally includes functionality to reduce the average time for a processor (114, 116, 118, 120) to access data by storing data that has been previously used by the processor. As an example, a cache may operate faster than other computing device memory and/or be physically located closer to a processor than other computing device memory. In one or more embodiments of the invention, a processor (114, 116, 118, 120) may check a cache (122, 124, 126, 128) for requested data. If the cache includes the requested data, the data may be provided to the processor (i.e., a cache hit occurs). If the cache does not include the requested data (i.e., a cache miss), then the cache may retrieve the data from memory or from another cache. In one or more embodiments of the invention, if a processor modifies data stored in a cache (e.g., creating a "dirty" cache line), then, using a write-back policy, the data may be written back to memory and/or another cache sometime later, and other caches may be notified so that any copies of the data in those caches may be invalidated.

A cache (122, 124, 126, 128) may be implemented on the same chip as a processor and/or may be implemented as separate hardware operatively connected to the processor. In one or more embodiments of the invention, a cache (122, 124, 126, 128) is also operatively connected to at least a portion of the memory (130, 132, 134, 136) of a computing device. A processor may be associated with a single cache, or may have more than one cache. Further, more than one processor may share a cache. In embodiments of the invention in which a given processor may be associated with more than one cache (not shown), the caches may be arranged as a hierarchy, with higher level caches having increased latency compared with lower level caches. As used herein, the term cache (122, 124, 126, 128) refers to any one or more caches associated with and operatively connected to any number of processors and any amount of memory of the computing device. In one or more embodiments of the invention, although not shown in FIG. 1, caches (122, 124, 126, 128) may include and/or be operatively connected to one or more cache controllers.

In one or more embodiments of the invention, a NUMA node (e.g., NUMA node A (106), NUMA node N (108), NUMA node B (110), NUMA node M (112)) includes at least one processor (114, 116, 118, 120) and some amount of memory (130, 132, 134, 136). Processors of a NUMA node may be able to access data from memory within the NUMA node, as well as data from memory in other NUMA nodes. However, access to memory located in a NUMA node with a processor may be faster (i.e., lower latency) for the processor than access of data from memory of other NUMA nodes (i.e., memory access times may be non-uniform). For example, in embodiments of the invention such as that shown in FIG. 1, processor A (114) of NUMA node A (106) may access data from cache A (122) and/or memory A (130) with lower latency than processor A accessing data from other NUMA nodes of the computing device (100), such as NUMA node N (108), NUMA node B (110), or NUMA node M (112).

In one or more embodiments of the invention, a computing device (100) has at least two NUMA nodes (106, 108, 110, 112). A NUMA node may include cache memory (e.g., a level two (L2) cache) as well as system memory (e.g., RAM). A NUMA node (106, 108, 110, 112) may include any number of processors, any amount of memory, and/or any number of caches operatively connected in any manner. In one or more embodiments of the invention, a NUMA node (106, 108, 110, 112) is a hardware NUMA node and the lower access times within the NUMA node result from the internal design of the computing device and the manner in which the components of the NUMA node are operatively connected. In other embodiments of the invention, NUMA nodes (106, 108, 110, 112) may be software NUMA nodes that are configured by a user, process, application, etc., using or executing on the computing device.

In one or more embodiments of the invention, a NUMA group (e.g., NUMA group A (102), NUMA group N (104)) refers to one or more NUMA nodes (106, 108, 110, 112) of a computing device (100) implementing NUMA. In embodiments of the invention in which a NUMA group (102, 104) has more than one NUMA node, a processor of a NUMA node of the NUMA group may access data from memory and/or cache of another NUMA node of the NUMA group with lower latency than accessing data from memory and/or cache of another NUMA group. For example, in embodiments of the invention such as that shown in FIG. 1, processor A (114) of NUMA node A (106) may access data from cache N (124) and/or memory N (132) of NUMA node N (108) with lower latency than processor A (114) accessing data from cache and/or memory located in NUMA nodes of other NUMA groups (e.g., NUMA node B (110) and NUMA node M (112) of NUMA group N (104)). As used herein, the term NUMA group may refer to a single NUMA node, or two or more NUMA nodes.

While FIG. 1 shows a configuration of components, other configurations may be used without departing from the scope of the invention. For example, various components may be combined to create a single component. As another example, the functionality performed by a single component may be performed by two or more components. Additionally, as mentioned above, a NUMA group may refer to only one NUMA node or to two or more NUMA nodes, and a computing device may include any number of NUMA nodes in any number of NUMA groups. Furthermore, a NUMA node may have any number of processors and/or caches, and any amount of memory. Moreover, processors, caches, and/or memory of a NUMA node may be operatively connected in any number of ways. Also, in one or more embodiments of the invention, a computing device may include processors, caches, and/or memory that are not part of a NUMA group and/or NUMA node. Accordingly, embodiments of the invention should not be considered limited to the specific arrangements of modules and elements shown in FIG. 1.

Figure 2:
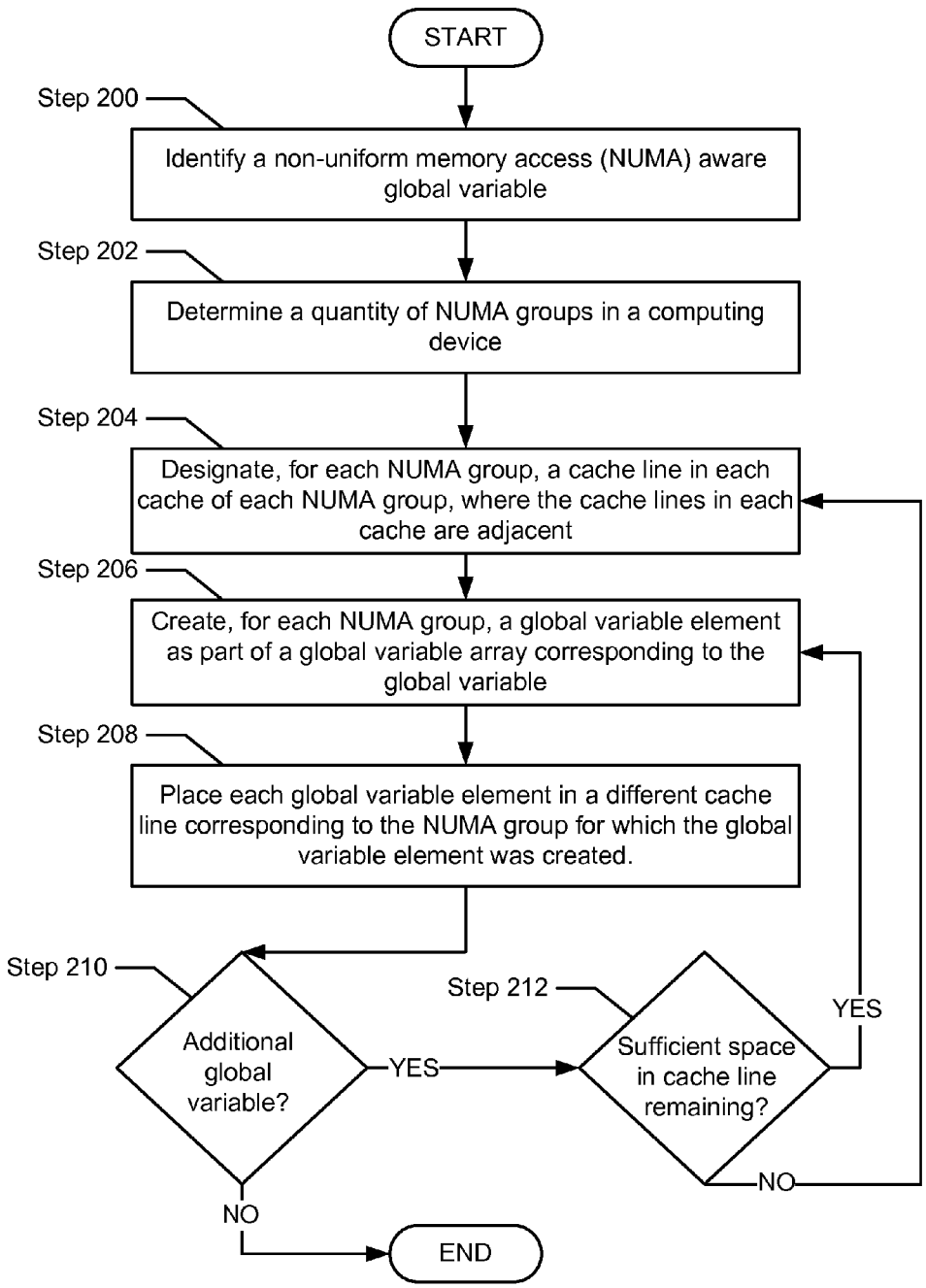
FIG. 2 shows a flowchart in accordance with one or more embodiments of the invention.
Figure 3:
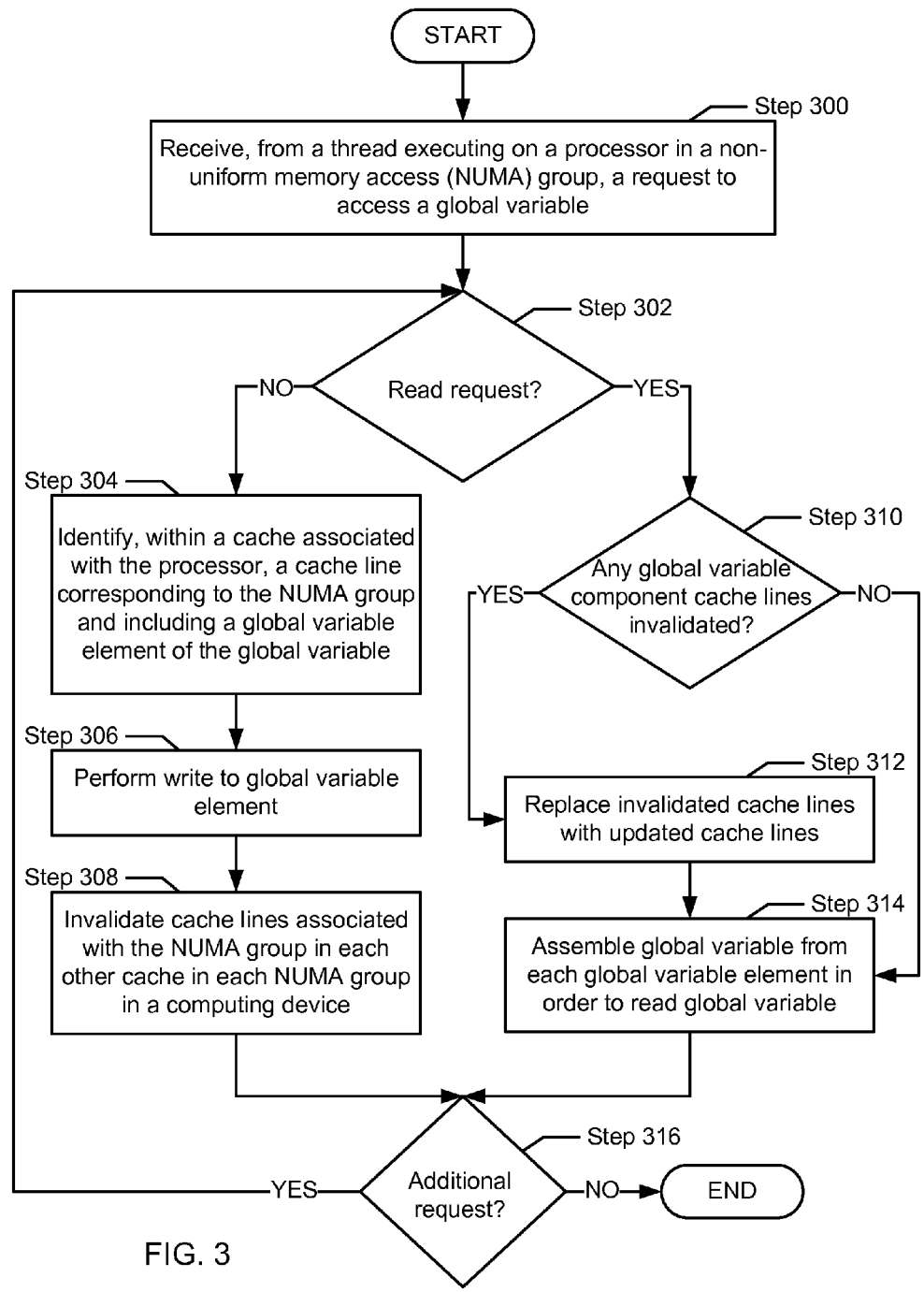
FIG. 3 shows a flowchart in accordance with one or more embodiments of the invention.

FIGS. 2 and 3 show flowcharts in accordance with one or more embodiments of the invention. While the various steps in these flowcharts are presented and described sequentially, one having ordinary skill in the art and the benefit of this Detailed Description will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for creating NUMA-aware global variables in accordance with one or more embodiments of the invention.

In Step 200, a global variable is identified. As used herein, the term global variable refers to any type of data and/or data structure that may be stored, temporarily and/or permanently, on any computer readable medium and that may be accessed by more than one entity executing on a computing device (e.g., two or more software threads executing on different processors of a computing device). A global variable may be data which may be accessed by more than one thread executing on any processors of a computing device. In one or more embodiments of the invention, the global variable identified in Step 200 is any global variable that may be represented as an array. Examples of such global variables include, but are not limited to, counters, lists, groups of mixed information stored as attributes of an object, etc.

In one or more embodiments of the invention, the global variable is identified using any method of identifying a global variable that is to be made NUMA-aware. For example, a memory controller and/or cache controller of a computing device may include functionality to identify global variables that have been marked a certain way by executing software, indicating the variables are to be made NUMA aware. As another example, executing software may include functionality to determine if a given global variable has been or will be accessed by processors in one or more NUMA nodes and/or NUMA groups of the computing device. In such an example, the software may include functionality to determine that a variable may be used by threads executing portions of the software on processors of different NUMA groups and, therefore, create the global variable as an array. As an additional example, software to be executed on a computing device may be written such that, when the software is executing on a computing device implementing NUMA, the software includes functionality to create global variables as an array (discussed below), rather than as a single global variable.

In Step 202, a determination is made as to a quantity of NUMA groups of a computing device. In computing devices in which a NUMA group consists of a single NUMA node, the determination may be made as to the quantity of NUMA nodes of the computing device (i.e., the quantity of NUMA nodes equals the quantity of NUMA groups). For example, a computing device may have four NUMA nodes. In such a system, if there is one NUMA node per NUMA group in the system, then the quantity determined is four. However, in such a system, if there are two NUMA nodes per NUMA group, then the quantity determined is two. As an example, the quantity of NUMA groups in a system may be a function of the hardware configuration on the computing device and may be determined by checking a value maintained by the operating system (e.g., stored as a value in a configuration file and made accessible to executing software). As another example, the quantity of NUMA groups of a computing device may be configured/configurable (e.g., by a user, by executing software, etc.). In one or more embodiments of the invention, NUMA nodes of the computing device may be arranged as two or more NUMA groups, each with more than one NUMA node. In such embodiments, one having ordinary skill in the art and having the benefit of this Detailed Description will understand that the quantity determined may be the number of NUMA nodes rather than the number of NUMA groups without departing from the scope of the invention.

In Step 204, a quantity of cache lines corresponding to the quantity of NUMA groups is identified in each cache of each NUMA group counted in Step 202. In one or more embodiments of the invention, each NUMA group is associated with one cache line in each cache. The cache lines may be contiguous (i.e., cache lines in adjacent locations in a cache). The cache lines with which a given NUMA group is associated may be in corresponding locations in each cache. For example, NUMA group A may be associated with cache line twenty-seven of each cache of the various NUMA groups, and NUMA group B may be associated with cache line twenty-eight of each cache of the various NUMA groups.

In Step 206, the global variable is partitioned such that an element exists corresponding to each of the cache lines corresponding to each of the NUMA groups. In one or more embodiments of the invention, the global variable is partitioned by creating an array corresponding to the global variable. In one or more embodiments of the invention, the array may be created with a quantity of elements matching the quantity of NUMA groups determined in Step 202.

In Step 208, each element of the partitioned global variable is placed a different cache line of the cache lines identified in Step 204. For example, if there are eight NUMA groups in the computing device, then an array including eight elements is created, and each element is placed on a different cache line in each cache, with each cache line corresponding to one of the NUMA groups. In one or more embodiments of the invention, the partitioned global variable is replicated such that each cache of the NUMA groups includes a copy of the global variable.

In Step 210, a determination is made as to whether there are any additional global variables. If there are no additional global variables, the process ends. However, if there are additional global variables, the process proceeds to Step 212.

In Step 212, a determination is made as to whether the cache lines that include the previously partitioned global variable elements have sufficient space left to accommodate an additional global variable element. In one or more embodiments of the invention, in scenarios where there is enough space to add the additional global variable elements to the various cache lines, the process returns to Step 206, and an array corresponding to the global variable is created and partitioned such that a copy of the global variable array elements reside in each cache of each NUMA group on the same cache lines in which global variable array elements were previously placed in Step 208.

For example, if a cache line is sixty-four bytes, and a partitioned global variable element is eight bytes, and four eight-byte elements (i.e., thirty-two total bytes) from global variables that were previously added to the cache lines are present on the cache line, then the additional global variable element may be added to the cache line, as each cache line includes an additional thirty-two bytes. In one or more embodiments of the invention, in scenarios in which there is not enough space left in the cache lines to accommodate additional global variable elements, the process returns to Step 204, and a new set of cache lines are designated before an array is created corresponding to the global variable and partitioned among the new set of cache lines in each cache of the NUMA groups. For example, if a cache line is sixty-four bytes, and a partitioned global variable element is eight bytes, and eight eight-byte elements (i.e., sixty-four total bytes) from global variables that were previously added to the cache lines are present on the cache line, then the additional global variable element may not be added to the cache line, and a new set of cache lines may be designated. In one or more embodiments of the invention, once all global variables have been made into an array of elements and placed into appropriate cache lines, the process ends.

In one or more embodiments of the invention, although not shown in FIG. 2, a cache line with two or more global variable array elements may also include padding for the remainder of the cache line without departing from the scope of the invention. As used herein, the term padding may refer to any data used to fill the remainder of a cache line on which two or more global variable array elements are stored. For example, the padding may be a random sequence of ones and zeros, all zeros, any pattern of ones and zeros, etc.

FIG. 3 shows a flowchart for accessing NUMA-aware global variables in accordance with one or more embodiments of the invention.

In Step 300, a request to access a global variable is received from a thread executing on a processor of a NUMA group. As used herein, the term thread refers to any sequence of instructions executing on any processor of a computing device. For example, a thread may be part of a computer program executing on the computing device. In such an example, multiple threads of the computer program may execute on different processors of the system. In one or more embodiments of the invention, global variables that have been partitioned across cache lines in the caches of the various NUMA groups of a computing device may be accessed by the various threads executing on different processors. In one or more embodiments of the invention, an access may be a read access or a write access.

In Step 302, a determination is made whether the access request is a read request. In one or more embodiments of the invention, a read request is a request to determine and/or obtain a value of the global variable (e.g., current count of a global counter) or any portion thereof (e.g., the value of one or more members of a list). In one or more embodiments of the invention, if the access requested is not a read request, then the access is a write request and the process proceeds to Step 304. In one or more embodiments of the invention, if the access requested is a read request, the process proceeds to Step 310.

In Step 304, a cache line is identified. In one or more embodiments of the invention, the cache line identified corresponds to the NUMA group to which the processor on which the requesting thread is executing belongs. In one or more embodiments of the invention, the cache line identified includes an element of the global variable to which the thread is requesting to write. In one or more embodiments of the invention, any thread executing on any of the one or more processors of a NUMA group will perform writes only to a cache line in a cache operatively connected to the processor on which the thread executes, and each such thread performs writes only to cache lines corresponding to the NUMA group to which the processor belongs. For example, if thread A executes on processor A of NUMA node A of NUMA group A, and cache line twenty-seven of each cache in the various NUMA groups of the system corresponds to NUMA group A, then thread A will write to the global variable element in cache line twenty-seven of a cache operatively connected to processor A.

In Step 306, a thread performs a write to the appropriate global variable element of the cache line identified in Step 304. In one or more embodiments of the invention, performing a write includes modifying the data of the global variable element. For example, if the global variable is a counter, and an event being counted (e.g., a certain code portion is executed) occurs within a thread, then the thread may write to a global variable element in the cache line of a cache operatively connected to the processor on which the thread executes. In such an example, the cache line that the thread writes to is the cache line corresponding to the NUMA group that the processor on which the thread executes belongs.

In Step 308, cache lines are invalidated. In one or more embodiments of the invention, the cache lines that are invalidated are the cache lines associated with the NUMA group of the processor on which the writing thread executes. In one or more embodiments of the invention, each cache of the various NUMA groups other than the cache in which a global variable element was written to in Step 306 has a cache line invalidated. In one or more embodiments of the invention, each cache line invalidated includes a copy of the global variable element that was written to in Step 306. A cache line may be marked as invalid using any method of indicating to any component or executing software of the computing device that the cache line includes data that is no longer valid. Data may be invalid when a write occurs on a copy of the data in another cache. As an example, each cache line may include a flag bit that is set when a cache line includes invalid data. In such an example, if a thread executing on a processor in a first NUMA group of a computing device writes to a global variable element on a cache line associated with the first NUMA group in a cache operatively connected to the processor, then each other cache line associated with the first NUMA group in each other cache has a flag bit set to indicate that the cache line is invalid.

Turning to Step 310, when a request to access a variable has been determined to be a read request (i.e., in Step 302), a determination is made as to whether any NUMA group-associated cache lines are marked as invalid. The relevant cache that is checked for invalid NUMA group-associated cache lines may be a cache operatively connected to a processor on which the thread requesting the read executes. The determination as to whether any cache lines are marked as invalid may be made by any appropriate component and/or executing software of the computing device. Examples of an entity that includes functionality to make such a determination include, but are not limited to, a cache controller, a memory controller, and/or a process executing on the computing device. As an example, when a thread executing on a processor requests to read a global variable, a cache controller associated with a cache operatively connected to the processor may examine whether a flag bit indicating an invalid cache line is set for any cache line in the cache that is associated with a NUMA group other than the NUMA group of the processor on which the read-requesting thread executes. If a determination is made that one or more cache lines in the relevant cache that are associated with other NUMA groups have been invalidated, the process proceeds to Step 312. If a determination is made that no cache lines in the relevant cache that are associated with other NUMA groups have been invalidated, the process proceeds to Step 314.

In Step 312, the one or more invalidated cache lines identified in Step 310 are replaced with valid cache lines. In one or more embodiments of the invention, to replace an invalid cache line associated with a particular NUMA group, a cache is identified within the particular NUMA group in which a cache line also associated with the particular NUMA group experienced a write to a global variable element. The identified cache line may then be used to replace the invalid cache line in the cache operatively connected to the processor on which the thread requesting to read the global variable executes.

In Step 314, the global variable, or any portion thereof, is assembled so that the thread requesting the read may read the global variable. For example, if the global variable is a counter, then the sum of each global variable element may be determined to allow the thread to read the correct present count of the event that the counter is designed to count.

In Step 316, a determination is made as to whether there are any additional access requests. In one or more embodiments of the invention, if there are additional requests, then the process returns to Step 302 to determine if the request is a read request. In one or more embodiments of the invention, if there are no additional requests, then the process ends.

FIGS. 4A-4D show an example in accordance with one or more embodiments of the invention. The following example is for explanatory purposes only and not intended to limit the scope of the invention.

Figure 4A:
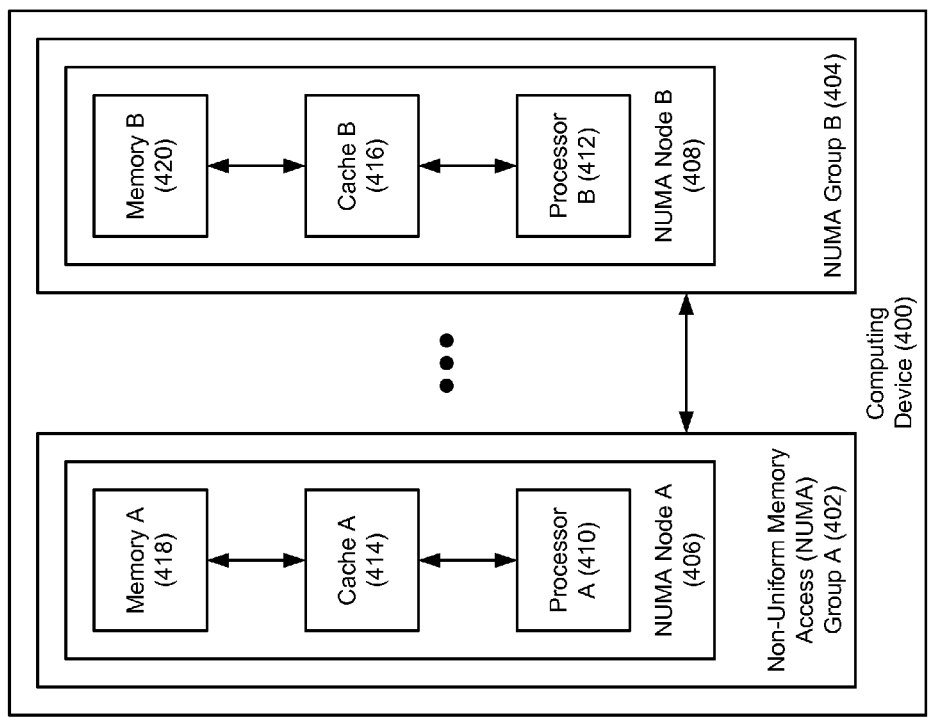
FIGS. 4A, 4B, 4C, and 4D show an example in accordance with one or more embodiments of the invention.

Referring to FIG. 4A, consider a scenario in which a computing device (400) includes two NUMA groups, NUMA group A (402) and NUMA group B (404). NUMA group A (402) includes only one NUMA node, NUMA node A (406). NUMA node A (406) includes cache A (414), as well as processor A (410) and memory A (418), which are operatively connected, at least in part, by cache A. NUMA group B (404) includes only one NUMA node, NUMA node B (408). NUMA node B (408) includes cache B (416), as well as processor B (412) and memory B (420), which are operatively connected, at least in part, by cache B. Each cache includes sixty-four byte cache lines, with the beginning of each cache line corresponding to a location in the memory, which is byte-addressable memory.

A computer program (not shown) is executing on the computing device (400) and requires eight global variables. The computer program is configured to recognize that each computing device (400) implements NUMA and therefore creates a global variable array for each global variable. The number of elements in each global variable array corresponds to the number of NUMA groups of the system, which, in the present example, is two. Each global variable array element is eight bytes.

A first global variable element of the first global variable array is stored in a first memory location that corresponds, via a memory address to the beginning of a first cache line in each of cache A (414) and cache B (416). The first cache line that the first memory location corresponds to is the cache line in each cache associated with NUMA group A (402). Next, the second global variable element of the first global variable is stored in a second memory location corresponding to a second cache line in each of cache A (414) and cache B (416). The second cache line that the second memory location corresponds to is the cache line in each cache associated with NUMA group B (404).

Next, a similar process is performed for the second global variable. A second global variable array is created with two elements, one for each NUMA group of the system. The first element of the second global variable array is stored in memory at the next addressable byte after the byte in which the first element of the first global variable array was stored such that the first element of each array are at adjacent memory locations. The second element of the second global variable array is stored in memory at the next addressable byte after the byte in which the second element of the first global variable array was stored such that the second element of each array are at adjacent memory locations.

The process described above for the first global variable and the second global variable is then repeated for the remaining six global variables, leading to a first sixty-four byte section of memory that includes the first element of each global variable array and a second sixty-four byte section of memory that includes the second element of each global variable array. After the global variable arrays are stored in memory, a first copy of the two sixty-four byte sections is stored in cache A (414) and a second copy of the two sixty-four byte sections is stored in cache B (416).

Figure 4B:
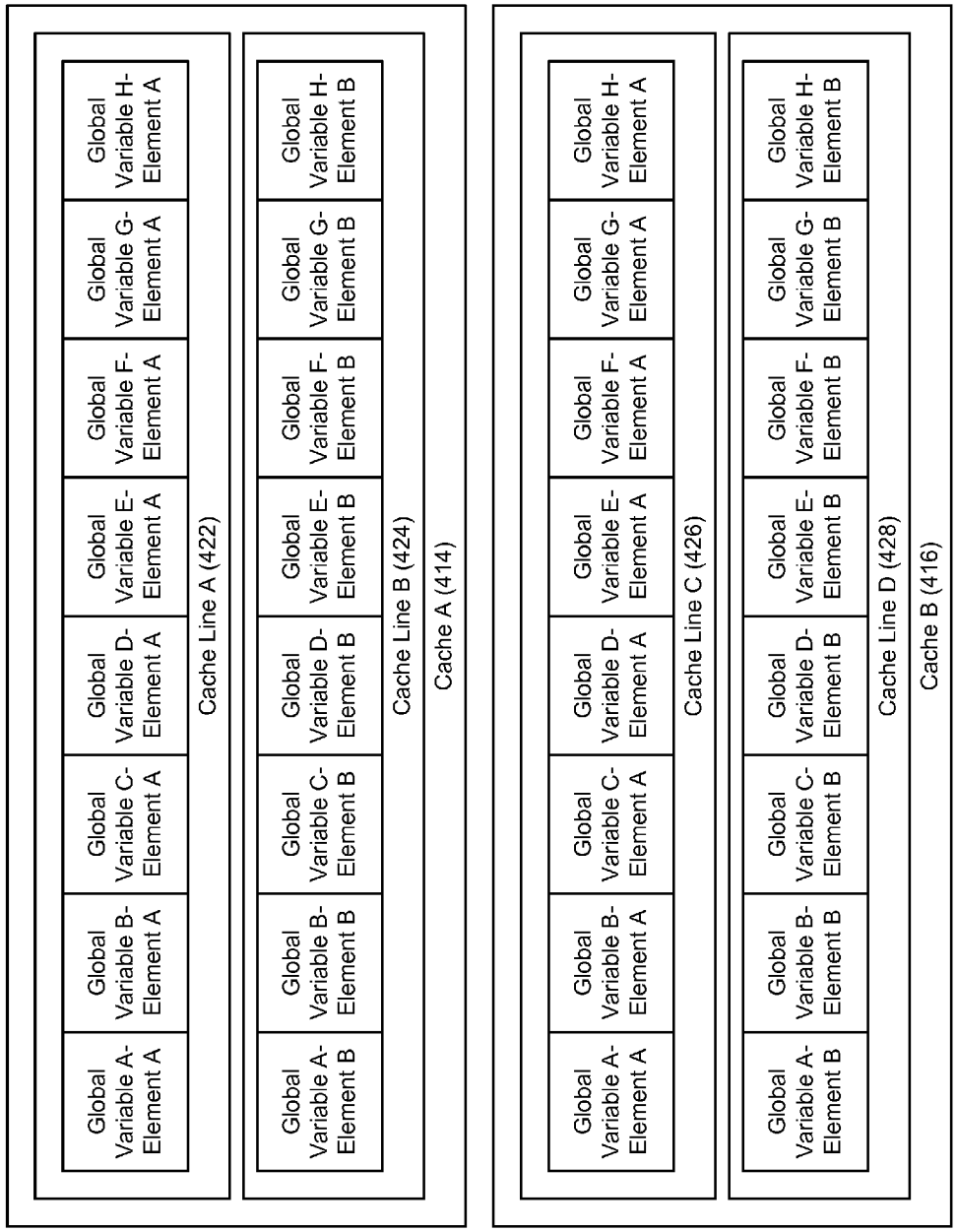

FIG. 4B shows a more detailed view of the results of the above-described partitioning of each of the eight global variables into a first element and a second element, and storing, in both cache A and cache B, each of the first elements on one cache line corresponding to NUMA group A, and each of the second elements on another cache line corresponding to NUMA group B. In FIG. 4B, the eight global variables are referred to as global variable A, global variable B, global variable C, global variable D, global variable E, global variable F, global variable G, and global variable H, each of which have been partitioned into a two-element global variable array, as described above. Accordingly, the global variable A array includes global variable A-element A and global variable A-element B. The global variable B array includes global variable B-element A and global variable B-element B. The global variable C includes global variable C-element A and global variable C-element B. Global variable D includes global variable D-element A and global variable D-element B. Global variable E includes global variable E-element A and global variable E-element B. Global variable F includes global variable F-element A and global variable F-element B. Global variable G includes global variable G-element A and global variable G-element B. Global variable H includes global variable H-element A and global variable H-element B.

As shown in FIG. 4B, element A of each of the global variable arrays is placed in cache line A (422) of cache A (414), and cache line C (426) of cache B (416). Cache line A (422) of cache A (414) and cache line C (426) of cache B (416) are each associated with NUMA group A (402 in FIG. 4A). As also shown in FIG. 4B, element B of each of the global variables is placed in cache line B (424) of cache A (414), and cache line D (428) of cache B (416). Cache line B (424) of cache A (414) and cache line D (428) of cache B (416) are each associated with NUMA group B (404 in FIG. 4A).

Continuing with the example, consider that global variable C is a counter for counting the number of times a certain loop of the computer program executes. The computer program is executing as two threads, thread A (not shown) on processor A (410) and thread B (not shown) on processor B (412). The loop being counted via global variable C may execute in either thread simultaneously or at different times. Each time the loop is executed in a given thread, the thread includes functionality to increment global variable C, which includes performing a write to global variable C. Specifically, thread A includes functionality to write to global variable C-element A in cache line A (422) of cache A (414) because thread A executes on processor A (410) of NUMA group A (402), which is associated with cache line A (422) of cache A (414). Similarly, thread B includes functionality to write to global variable C-element B in cache line D (428) because thread B executes on processor B (412) of NUMA group B (404), which is associated with cache line D (428) of cache B (416).

Next, the loop being counted by global variable C is executed twenty-seven times in thread A. Therefore, thread A writes the number twenty-seven to global variable C-element A in cache line A (422) of cache A (414). Then, the cache line in cache B corresponding to NUMA group A (402) (i.e., cache line C (426)) is marked as invalid by writing a one to the flag bit that indicates a cache line is invalid. Sometime later, the loop being counted by global variable C is executed fifty-four times in thread B. Therefore, thread B writes the number fifty-four to global variable C-element B in cache line D (428) of cache B (416). Then, the cache line in cache A corresponding to NUMA group B (404) (i.e., cache line B (424)) is marked as invalid.

Figure 4C:
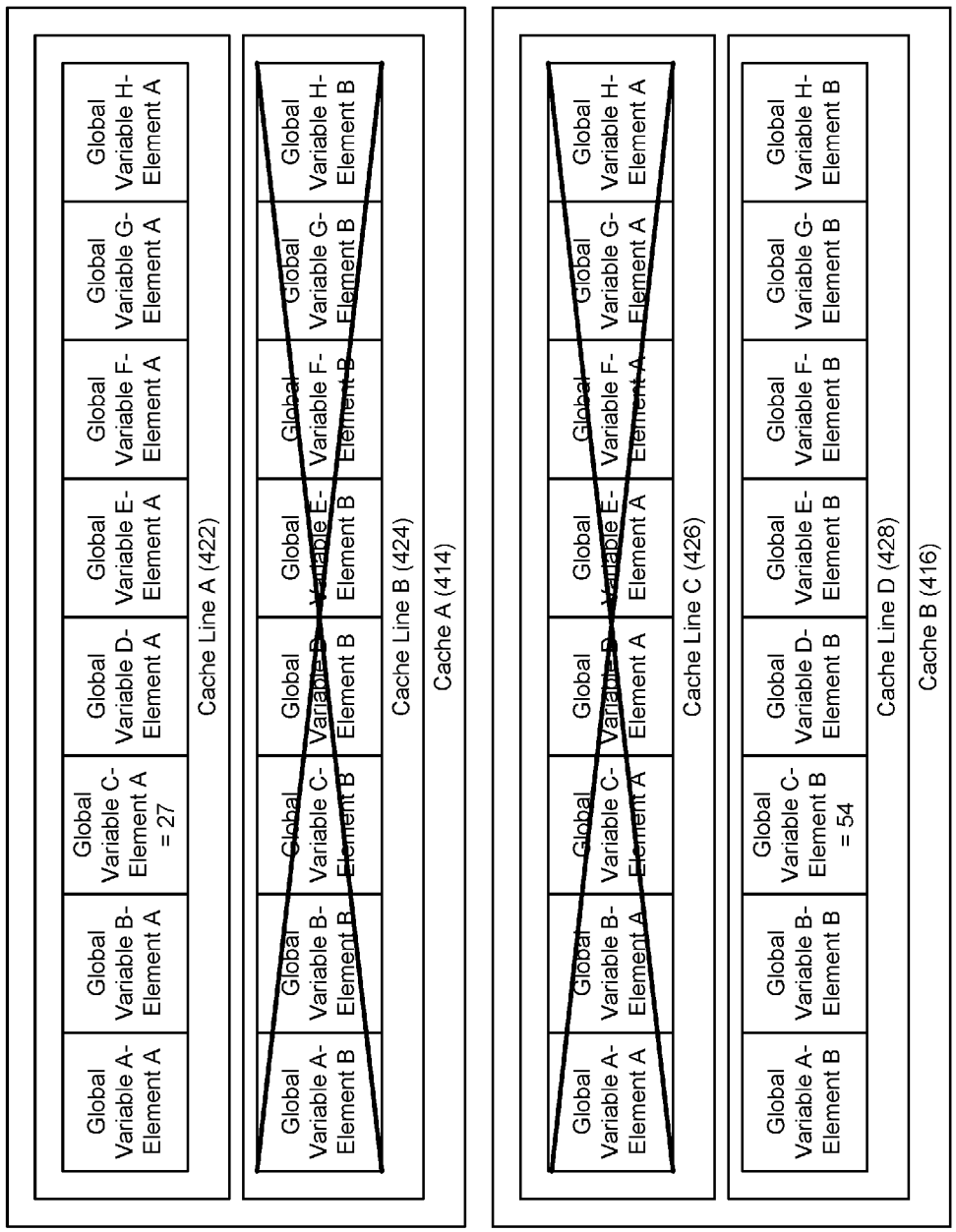

The results of the actions described above are shown in FIG. 4C. In FIG. 4C, an X over cache line B of cache A and cache line C of cache B has been placed to indicate that those cache lines are invalid (e.g., cache line B and cache line C have a flag bit (not shown) set to indicate that the cache lines are invalid). Additionally, global variable C-element A in cache line A is shown as being equal to twenty-seven and global variable C-element B in cache line D is shown as being equal to fifty-four.

Figure 4D:
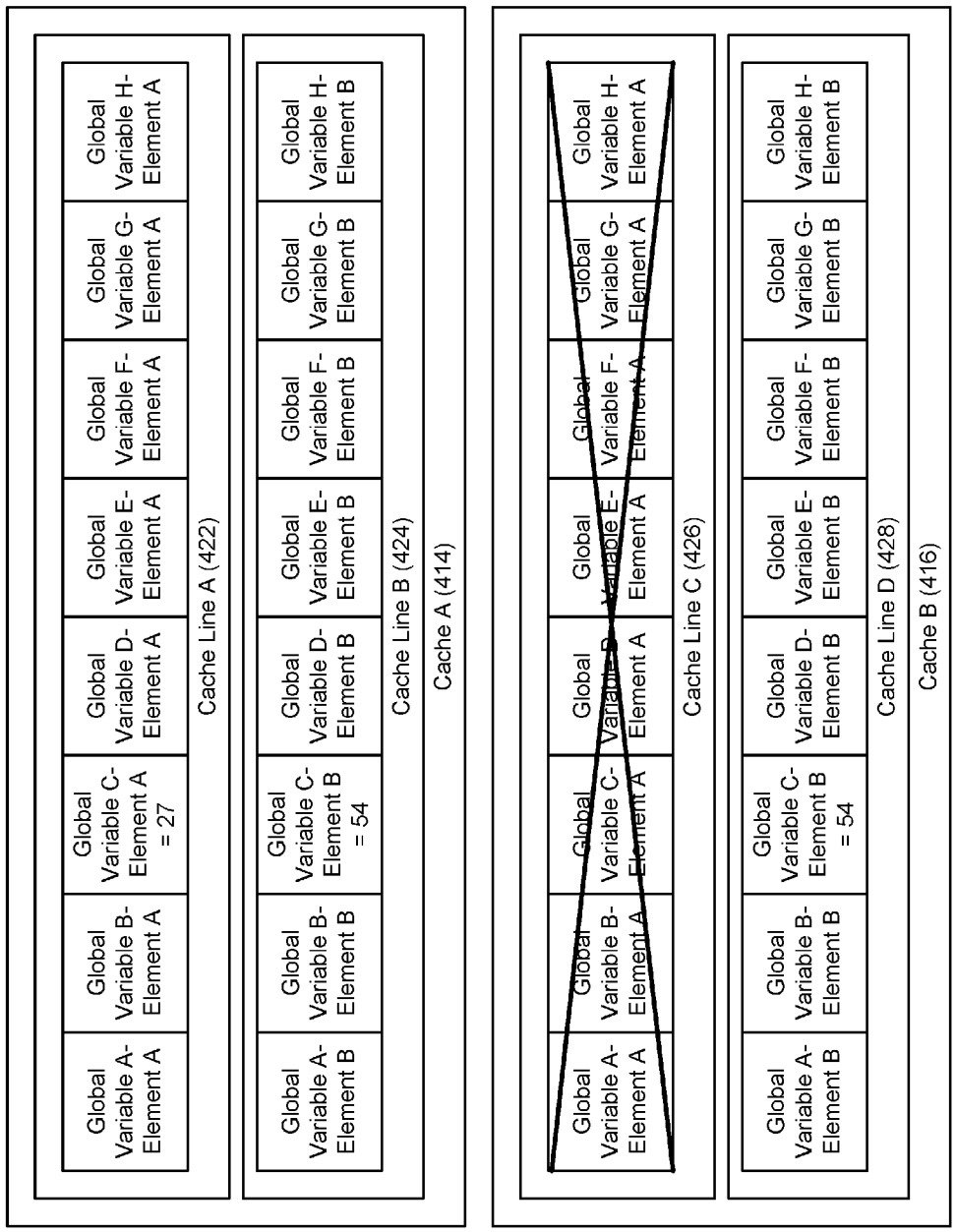

Next, thread A requests to read global variable C to determine how many times the loop has been executed. Therefore, a copy of cache line D in cache B is obtained from cache B and used to replace cache line B in cache A. FIG. 4D shows the result of the cache line replacement. In FIG. 4D, cache line B of cache A is no longer marked as invalid, and global variable C-element B in cache line B of cache A is now shown as equal to fifty-four.

In order to read global variable C, and determine how many times the loop has been executed, thread A takes each element of global variable A in cache A (i.e., global variable C-element A in cache line A and global variable C-element B in cache line B), and adds them to obtain eighty-one as the number of times that the loop was executed.

In the preceding example, the placement of eight global variable array elements on one cache line corresponding to NUMA group A and another cache line corresponding to NUMA group B in each of cache A and cache B may reduce the amount of cache space required to make global variable A and global variable B NUMA-aware.

In one or more embodiments of the invention, reduction of the amount of cache space required to implement NUMA-aware global variables modifies the manner in which a computing device implementing NUMA functions, and thereby improves the functioning of the computing device itself via, for example, allowing for a greater number of NUMA-aware global variables, reducing the amount of space in a cache that is used as padding rather than to store data relevant to activities of any given processor of the computing device, etc.

Figure 5:
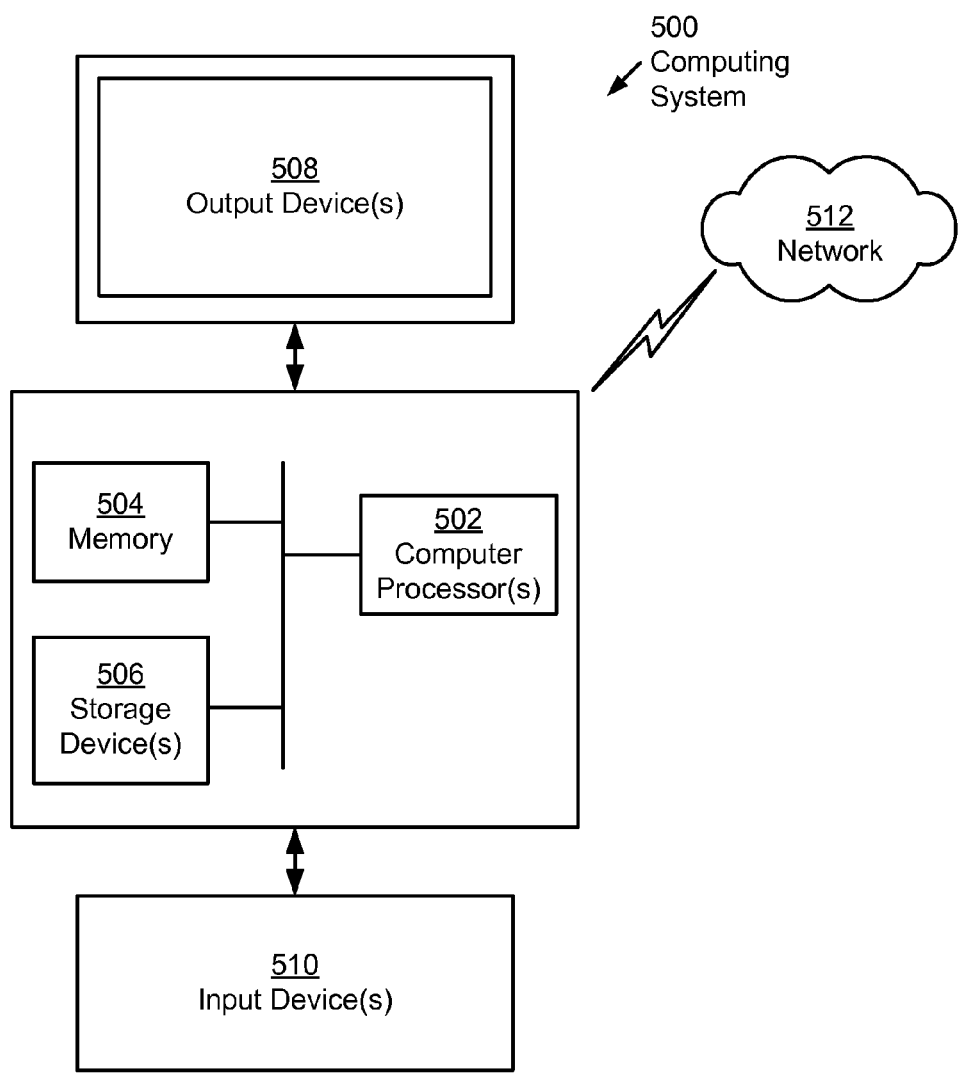
FIG. 5 shows a computing system in accordance with one or more embodiments of the invention.

Embodiments of the invention may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making global variables non-uniform memory access (NUMA)-aware, the method comprising:
   identifying a first global variable and a second global variable;
   determining a quantity of a plurality of NUMA groups of a computing device;
   partitioning, based on the quantity of the plurality of NUMA groups, the first global variable into a first global variable array comprising a plurality of first global variable array elements;
   storing each first global variable array element of the first global variable array in a different cache line of a first plurality of cache lines of a first cache associated with a first NUMA group of the plurality of NUMA groups;
   partitioning, based on the quantity of the plurality of NUMA groups, the second global variable into a second global variable array comprising a plurality of second global variable array elements; and
   storing each second global variable array element of the second global variable array in a different cache line of a second plurality of cache lines of a second cache associated with a second NUMA group of the plurality of NUMA groups.

2. The method of claim 1, further comprising:
   associating, before partitioning the first global variable, a first cache line of the first plurality of cache lines with the first NUMA group and a second cache line of the first plurality of cache lines with the second NUMA group; and associating, before partitioning the second global variable, a third cache line of the second plurality of cache lines with the first NUMA group, and a fourth cache line of the second plurality of cache lines with the second NUMA group.

3. The method of claim 2, further comprising:
receiving, from a first thread executing on a first processor of the first NUMA group, a request to perform a write to the second global variable;
performing the write to a second global variable element in the first cache line associated with the first NUMA group to obtain an updated first cache line; and
invalidating the third cache line in the second plurality of cache lines associated with the first NUMA group to obtain an invalidated third cache line.

4. The method of claim 3, further comprising:
receiving, from a second thread executing on a second processor of the second NUMA group and after the write is performed by the first thread, a request to read the first global variable;
determining that the second plurality of cache lines comprises the invalidated third cache line associated with the first NUMA group;
obtaining, based on the determination, a copy of the updated first cache line from the first cache;
replacing the invalidated third cache line with the copy of the updated first cache line; and
reading the first global variable.

5. The method of claim 4, wherein reading the first global variable comprises determining a value using the plurality of first global variable array elements in the second plurality of cache lines.

6. The method of claim 5, wherein the first global variable is a counter.

7. The method of claim 1, wherein each NUMA group of the plurality of NUMA groups comprises a plurality of NUMA nodes.

8. A non-transitory computer readable medium comprising instructions that, when executed by a computer processor, perform a method for making global variables non-uniform memory access (NUMA) aware, the method comprising:
identifying a first global variable and a second global variable;
determining a quantity of a plurality of NUMA groups of a computing device;
partitioning, based on the quantity of the plurality of NUMA groups, the first global variable into a first global variable array comprising a plurality of first global variable array elements;
storing each first global variable array element of the first global variable array in a different cache line of a first plurality of cache lines of a first cache associated with a first NUMA group of the plurality of NUMA groups;
partitioning, based on the quantity of the plurality of NUMA groups, the second global variable into a second global variable array comprising a plurality of second global variable array elements; and
storing each second global variable array element of the second global variable array in a different cache line of a second plurality of cache lines of a second cache associated with a second NUMA group of the plurality of NUMA groups.

9. The non-transitory computer readable medium of claim 8, wherein the method further comprises:
associating, before partitioning the first global variable, a first cache line of the first plurality of cache lines with the first NUMA group and a second cache line of the first plurality of cache lines with the second NUMA group; and
associating, before partitioning the second global variable, a third cache line of the second plurality of cache lines with the first NUMA group, and a fourth cache line of the second plurality of cache lines with the second NUMA group.

10. The non-transitory computer readable medium of claim 9, wherein the method further comprises:
receiving, from a first thread executing on a first processor of the first NUMA group, a request to perform a write to the second global variable;
performing the write to a second global variable element in the first cache line associated with the first NUMA group to obtain an updated first cache line; and
invalidating the third cache line of the second plurality of cache lines associated with the first NUMA group to obtain an invalidated third cache line.

11. The non-transitory computer readable medium of claim 10, wherein the method further comprises:
receiving, from a second thread executing on a second processor of the second NUMA group and after the write is performed by the first thread, a request to read the first global variable;
determining that the second plurality of cache lines comprises the invalidated third cache line associated with the first NUMA group;
obtaining, based on the determination, a copy of the updated first cache line from the first cache;
replacing the invalidated third cache line with the copy of the updated first cache line; and
reading the first global variable.

12. The non-transitory computer readable medium of claim 11, wherein reading the first global variable comprises determining a value using the plurality of first global variable array elements in the second plurality of cache lines.

13. The non-transitory computer readable medium of claim 12, wherein the first global variable is a counter.

14. The non-transitory computer readable medium of claim 8, wherein each NUMA group of the plurality of NUMA groups comprises a plurality of NUMA nodes.

15. A system for making global variables non-uniform memory access (NUMA) aware, the system comprising:
a first NUMA group of a plurality of NUMA groups of a computing device, the first NUMA group comprising a first memory, a first processor, and a first cache operatively connected to the first processor and the first memory; and
a second NUMA group of the plurality of NUMA groups of the computing device, the second NUMA group comprising a second memory, a second processor, and a second cache operatively connected to the second processor and the second memory,
wherein the computing device, at least in part, is configured to:
identify a first global variable and a second global variable;
determine a quantity of the plurality of NUMA groups of the computing device;
partition, based on the quantity of the plurality of NUMA groups, the first global variable into a first global variable array comprising a plurality of first global variable array elements;

store each first global variable array element of the first global variable array in a different cache line of a first plurality of cache lines of the first cache;

partition, based on the quantity of the plurality of NUMA groups, the second global variable into a second global variable array comprising a plurality of second global variable array elements; and store each second global variable array element of the second global variable array in a different cache line of a second plurality of cache lines of the second cache.

16. The system of claim 15, wherein the computing device is further configured to:

associate, before partitioning the first global variable, a first cache line of the first plurality of cache lines with the first NUMA group and a second cache line of the first plurality of cache lines with the second NUMA group; and associate, before partitioning the second global variable, a third cache line of the second plurality of cache lines with the first NUMA group, and a fourth cache line of the second plurality of cache lines with the second NUMA group;

receive, from a first thread executing on the first processor, a request to perform a write to the second global variable;

perform the write to a second global variable element in the first cache line associated with the first NUMA group to obtain an updated first cache line; and invalidate the third cache line in the second plurality of cache lines associated with the first NUMA group to obtain an invalidated third cache line.

17. The system of claim 16, wherein the computing device is further configured to:

receive, from a second thread executing on the second processor and after the write is performed by the first thread, a request to read the first global variable;

determine that the second plurality of cache lines comprises the invalidated third cache line associated with the first NUMA group;

obtain, based on the determination, a copy of the updated first cache line from the first cache;

replace the invalidated third cache line with the copy of the updated first cache line; and read the first global variable.

18. The system of claim 17, wherein reading the first global variable comprises determining a value using the plurality of first global variable array elements in the second plurality of cache lines.

19. The system of claim 18, wherein the first global variable is a counter.

20. The system of claim 15, wherein each NUMA group of the plurality of NUMA groups comprises a plurality of NUMA nodes.

* * * * *